United States Patent [19]

Fukasawa

[11] Patent Number: 4,751,553
[45] Date of Patent: Jun. 14, 1988

[54] READER-PRINTER

[75] Inventor: Motomu Fukasawa, Kawasaki, Japan

[73] Assignee: Canon Kabushiki Kaisha, Tokyo, Japan

[21] Appl. No.: 66,127

[22] Filed: Jun. 24, 1987

[30] Foreign Application Priority Data

Jul. 7, 1986 [JP] Japan .................. 61-159173

[51] Int. Cl.⁴ ............................................. G03B 13/28
[52] U.S. Cl. ........................................ 355/45; 355/5; 355/8; 355/51
[58] Field of Search ...................... 355/5, 8, 45, 51, 65, 355/66

[56] References Cited

U.S. PATENT DOCUMENTS

| | | | |
|---|---|---|---|
| 3,988,064 | 10/1976 | Sone et al. ........................... | 355/45 X |
| 4,170,412 | 10/1979 | Grace et al. ............................ | 355/5 |
| 4,213,696 | 7/1980 | Wise ..................................... | 355/5 X |
| 4,349,271 | 9/1982 | Toriumi et al. ...................... | 355/8 X |
| 4,367,033 | 1/1983 | Watanabe .......................... | 355/45 X |
| 4,593,990 | 6/1986 | Aver et al. ............................ | 355/45 |
| 4,616,921 | 10/1986 | Matson et al. ......................... | 355/5 |
| 4,678,314 | 7/1987 | Uchida et al. ......................... | 355/5 |

Primary Examiner—Richard A. Wintercorn
Attorney, Agent, or Firm—Fitzpatrick, Cella, Harper & Scinto

[57] ABSTRACT

In a reader-printer having a first optical device for directing a light from a projection lens to a screen and a second optical device for directing the light to a photosensitive medium, the first optical device includes a first mirror for reflecting the light from the projection lens, and the second optical device includes a second mirror movable toward and away from the reflection optical path of the first mirror and movable across the reflection optical path, and third mirror disposed outside the optical path of the first optical device and reflecting the light reflected by the second mirror toward the first mirror. The light reflected by the third mirror is again reflected by the first mirror and thereafter directed to a photosensitive surface.

7 Claims, 2 Drawing Sheets

READER-PRINTER

BACKGROUND OF THE INVENTION

1. Field of the Invention

This invention relates to a reader-printer, and in particular to a reader-printer for sequentially scanning an image on a drum-like photosensitive medium having a curvature in a one-dimensional direction which is rotating or rotationally vibrating by the use of a scanning mirror disposed at the image field side of a projection optical system, thereby causing the image to be projected and formed.

2. Description of the Related Art

In a copying apparatus, a microfilm reader-printer or the like, it has usually been the practice to sequentially scan a light beam from an original passed through a projection optical system by a scanning mirror and project and image the light beam on the surface of a drum-like photosensitive medium.

Image devices using a scanning mirror to direct a light beam passed through a projection optical system onto the surface of a photosensitive medium have heretofore been proposed, for example, in U.S. Pat. No. 4,299,480 and Japanese Laid-Open Patent Application No. 126258/1980.

In the case of a scanning mirror system, as the scanning position of the scanning mirror is farther from a projection lens and accordingly nearer to a screen for the reader, or as the angle of incidence of light with respect to the scanning mirror is greater, the image is more deteriorated and therefore, it is necessary to effect the scanning of the scanning mirror at a position as near as possible to the projection lens and with the angle of incidence being reduced. On the other hand, it is necessary in preventing the deterioration of the image caused by out-of-focus to make the optical distance from a microfilm original to a screen and the optical distance from the original to the photosensitive medium of the printer equal to each other. However, in a scanning mirror system according to the prior art, an attempt to meet the above-described two requirements has led to the increased lengths of the optical path for the reader and the optical path for the printer, which in turn has led to the difficulty in making the reader-printer for microfilm compact.

SUMMARY OF THE INVENTION

In view of the above-noted problems peculiar to the prior art, the present invention intends to provide a compact one-mirror scanning type reader-printer for microfilm in which image scanning is effected at a position near a projection lens to thereby prevent image deterioration and in which the distance between the original and the screen and the distance between the original and the photosensitive medium of the printer can be made equal to each other.

It is a further object of the present invention to provide a compact reader-printer in which the optical path for the reader is efficiently used as the optical path for the printer to thereby reduce the space occupied exclusively by the optical system for the printer.

DESCRIPTION OF THE PREFERRED EMBODIMENTS

Figure 1:
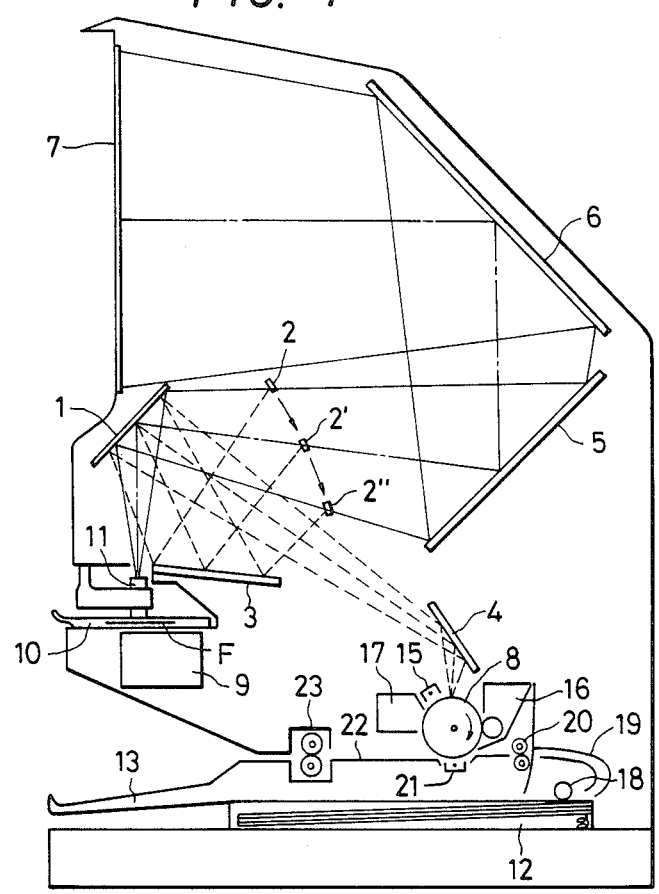
FIG. 1 shows the construction of a microfilm reader-printer of which the present invention is applied.

Referring to FIG. 1, reference numeral 1 designates a first mirror for reflecting a light from a projection lens 11, reference numerals 5 and 6 denote mirrors for a reader, and reference numeral 7 designates a screen. The mirrors 1, 5 and 6 are planar mirrors of a size capable of reflecting the imaging light beam by the projection lens 11, and together form an optical path for the reader for directing the light from the projection lens to the screen 7.

Reference numeral 2 denotes a second mirror for scanning. The second mirror 2 is of a size capable of reflecting part of the effective imaging light beam by the projection lens, and is movable toward and away from the reflecting optical path of the mirror 1. The second mirror 2 is retracted out of the optical path during the reader mode in which an image is projected onto the screen 7, and is moved into the optical path in a direction which intersects the reflection optic axis of the first mirror 1 during the printer mode in which an image is projected onto a photosensitive drum 8. Reference numerals 3 and 4 designate mirrors for a printer. The mirrors 3 and 4 are planar mirrors of a size capable of reflecting all of the effective imaging light beam by the projection lens. The mirrors 1-4 together form an optical path for the printer for projecting an image onto the photosensitive drum 8. Reference numeral 10 denotes a film carrier for holding a microfilm original (microfiche) F. When the apparatus is used as a microfilm reader, the microfilm original F illuminated by an illuminating system 9 is projected as an enlarged image on the screen 7 by the projection lens 11 via the mirrors 1, 5 and 6.

When the apparatus is used as a microfilm printer, the second mirror 2 normally retracted out of the reader optic path comes into the optic path for the reader between the mirrors 1 and 5 as shown, and is moved as indicated by 2' and 2" to effect image field scanning, and the microfilm image light from the first mirror 1 thus scanned is bent by the second mirror 2 as indicated by a broken line in FIG. 1, again enters the first mirror 1 via the third mirror 3 while changing its angle of incidence, and is directed onto the photosensitive drum 8 of the printer by the fourth mirror 4 disposed at a suitable position and is imaged thereon. The photosensitive drum 8 is being rotated in one direction, and printing paper is fed from a paper supply cassette 12 in synchronism with the rotation of the photosensitive drum 8, and the image on the photosensitive drum 8 is printed on the printing paper, whereafter the printing paper is discharged onto a tray 13. Of course, the scanning speed of the second mirror 2 is determined so that the speed of movement of the image on the photosensitive drum 8 by the scanning of the second mirror 2 and the surface speed of the photosensitive drum 8 are equal to each other.

In the foregoing, the construction of the optical system is made such that the optical distance from the microfilm original F to the screen 7 and the optical distance from the microfilm original F to the photosensitive drum 8 are equal to each other, and the second mirror 2 is disposed so as to effect scanning at a location nearer to the projection lens 11 than to the screen 7. This is possible by a design such that as described above, the image light from the first mirror 1 bent by the second mirror 2 is caused to again enter the first mirror 1 via the third mirror 3 while the angle of incidence is changed, whereafter it is directed to the photosensitive drum 8, and moreover is possible without incurring the bulkiness of the entire apparatus.

The second mirror 2 is of an elongate shape which projects a slit-like part area of the entire image of one frame of the microfilm onto the photosensitive drum 8, and is moved in synchronism with the photosensitive drum 8 by a drive source, not shown, while the angle of inclination thereof is changed in a direction intersecting the reflection optic axis of the first mirror 1 at predetermined angle. The locus of movement of the second mirror 2 is curved or straight. A charger 15, a developing device 16, a cleaner 17, etc. are disposed around the photosensitive drum 8.

Sheets of printing paper in the paper supply cassette 12 are fed one by one by a paper feed roller 18, and the sheet of printing paper thus fed is further fed via a guide plate 19 and feed rollers 20, and the toner image on the photosensitive drum 8 is transferred to the sheet of printing paper by a transfer charger 21, whereafter the sheet of printing paper is directed to a fixing device 23 through a guide plate 22 and discharged onto the tray 13.

Figure 2:
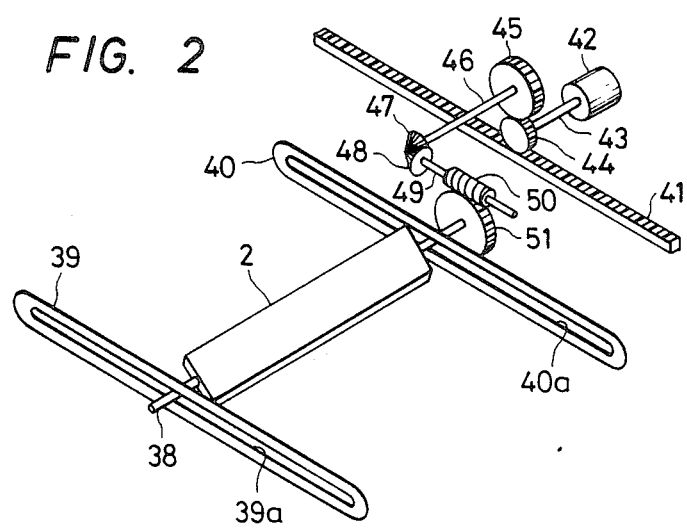
FIG. 2 shows the construction of a scanning mirror moving mechanism.

A specific device for moving the scanning mirror to effect scanning is shown in FIG. 2. In FIG. 2, guide rail members 39 and 40 for determining the movement path of the scanning mirror are disposed at the opposite sides of the second mirror. Reference numeral 38 designates support members attached to the opposite ends of the second mirror 2. The second mirror 2 may be moved by being guided by guide slots 39a and 40a formed in the guide rail members 39 and 40, respectively. Reference numeral 41 denotes a rack disposed so that the pitch line thereof is coincident with or parallel to the movement path of the second mirror. Reference numeral 42 designates a motor as a drive source, and reference numeral 43 denotes the shaft of the motor 42. A gear 44 is fitted on the end of the shaft 43. The gear 44 is in meshing engagement with the rack 41 and with a gear 45. The gear 45 is connected to a bevel gear 47 through a connecting shaft 46, and the bevel gear 47 is in meshing engagement with a bevel gear 48. Designated by 50 is a worm. The bevel gear 48 is fitted on one end of the shaft 49 of the worm 50. The worm 50 is in meshing engagement with a worm wheel 51 which is mounted on the support member 38.

In the above-described construction, when the motor 42 is driven, the gear 44 is moved in the scanning direction while being rotated on the rack 41, whereby the second mirror 2 is moved on a straight track. The worm wheel 51 connected to the second mirror 2 is rotated in confirmity with the amount of movement of the second mirror 2, whereby the second mirror 2 is rotated and the inclination of the reflecting surface thereof is varied.

Figure 3:
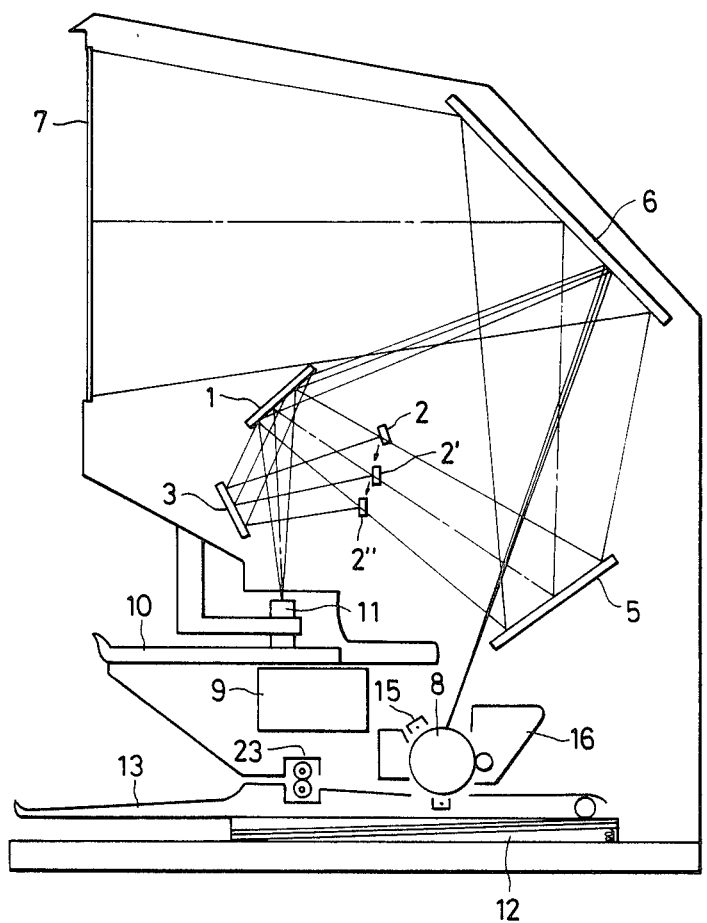
FIG. 3 shows the construction of another embodiment of the present invention.

FIG. 3 shows another embodiment of the present invention. In this embodiment, parts similar to those of the previous embodiment are given similar reference numerals.

In the embodiment of FIG. 3, the second mirror 2 and the third mirror 3 together forming the optical path for the printer are provided in opposed relationship with each other at the opposite sides of the optical path between the projection lens 11 and the first mirror 1. The angles of inclination of the mirrors 1, 2, 3 and 5 differ from those in the embodiment of FIG. 1.

The second mirror 2 is positioned outside the reflection optical path of the first mirror 1 during the reader mode, and comes into the reflection optical path of the first mirror 1 and is moved at a predetermined speed across said reflection optical path during the printer mode. During the reader mode, an optical path for the reader is formed by the mirrors 1, 5 and 6. On the other hand, during the printer mode, an optical path for the printer is formed by the mirrors 1, 2, 3 and 6. That is, when a print command is provided, the second mirror 2 comes into the reflection optical path of the first mirror 1, and the light reflected by the first mirror 1 is reflected by the second mirror, whereafter it is reflected by the third mirror 3, and then is again reflected by the first mirror 1, and then is reflected by the mirror 6 and directed to the photosensitive drum 8. Accordingly, most of the optical path for the printer is formed in the space of the reader optical system and therefore, the space occupied exclusively by the optical system exclusively for the printer becomes smaller and thus, the apparatus can be made compact.

The embodiment of FIG. 3, as compared with the embodiment of FIG. 1, can reduce the number of mirrors.

The number of mirrors in each optical system is not restricted to that shown in the embodiments, but may be set to a suitable number.

I claim:

1. A reader-printer having first optical means for directing a light from a projection lens to a screen, and second optical means for directing the light to a photosensitive medium, said first optical means including a first mirror for reflecting the light from the projection lens, said second optical means including a second mirror movable toward and away from the reflection optical path of said first mirror and movable across said reflection optical path, and a third mirror disposed outside the optical path of said first optical means and reflecting the light reflected by said second mirror toward said first mirror, the light reflected by said third mirror being again reflected by said first mirror and thereafter directed to a photosensitive surface.

2. A reader-printer according to claim 1, wherein said second and third mirrors are disposed at one side of an optical path formed between said projection lens and said first mirror.

3. A reader-printer according to claim 1, wherein said second and third mirrors are disposed in opposed relationship with each other at the opposite sides of an optical path formed between said projection lens and said first mirror.

4. A reader-printer according to claim 1, wherein said second mirror has its angle of inclination varied while being moved across the reflection optical path of said first mirror.

5. A reader-printer according to claim 1, wherein said first and third mirrors are of a size capable of reflecting the effective light beam by said projection lens, and said second mirror is of a size capable of reflecting part of said effective light beam.

6. A reader-printer according to claim 1, wherein said second mirror is moved at the same speed as said photosensitive surface.

7. A reader-printer according to claim 1, wherein said first optical means includes a fourth mirror for directing the light reflected by said first mirror to said screen or said photosensitive surface, and during the reader mode, the light reflected by said first and fourth mirrors is directed to said screen, and during the printer mode, the light reflected to said first to fourth mirrors is directed to said photosensitive surface.

* * * * *

UNITED STATES PATENT AND TRADEMARK OFFICE
CERTIFICATE OF CORRECTION

PATENT NO. : 4,751,553

DATED : June 14, 1988

INVENTOR(S) : MOTOMU FUKASAWA

It is certified that error appears in the above-identified patent and that said Letters Patent is hereby corrected as shown below:

In [57] ABSTRACT
    Line 9, "and third" should read --and a third--.

COLUMN 1
    Line 68, "of" should read --to--.

COLUMN 2
    Line 31, "projection lens" should read --projection lens 11.--.

COLUMN 3
    Line 2, "that" should read --that,--.
    Line 55, "confirmity" should read --conformity--.

COLUMN 4
    Line 12, "second mirror," should read --second mirror 2,--.

Signed and Sealed this

Thirty-first Day of October, 1989

*Attest:*

DONALD J. QUIGG

*Attesting Officer*    *Commissioner of Patents and Trademarks*